US00RE50277E

(19) United States
(12) Reissued Patent
Song et al.

(10) Patent Number: US RE50,277 E
(45) Date of Reissued Patent: Jan. 21, 2025

(54) POWER CONVERTER AND METHOD OF CONTROL THEREOF

(71) Applicant: Delta Electronics, Inc., Taipei (TW)

(72) Inventors: Haibin Song, Shanghai (CN); Laszlo Huber, Cary, NC (US); Daofei Xu, Shanghai (CN); Alpha Zhang, Shanghai (CN); Milan M. Jovanovic, Cary, NC (US); Chien-Chung Chang, Taoyuan (TW)

(73) Assignee: Delta Electronics, Inc., Neihu (TW)

(21) Appl. No.: 16/931,904

(22) Filed: Jul. 17, 2020

Related U.S. Patent Documents

Reissue of:
(64) Patent No.: 10,141,853
Issued: Nov. 27, 2018
Appl. No.: 15/428,885
Filed: Feb. 9, 2017

(51) Int. Cl.

| | |
|---|---|
| ***H02M 3/335*** | (2006.01) |
| ***H02M 1/00*** | (2007.01) |
| ***H02M 1/32*** | (2007.01) |
| ***H02M 1/34*** | (2007.01) |

(52) U.S. Cl.
CPC ..... *H02M 3/33569* (2013.01); *H02M 1/32* (2013.01); *H02M 1/34* (2013.01); *H02M 3/33592* (2013.01); *H02M 1/0009* (2021.05); *H02M 1/0048* (2021.05); *H02M 1/0054* (2021.05); *H02M 1/344* (2021.05); *Y02B 70/10* (2013.01)

(58) Field of Classification Search
CPC .. H02M 3/33507; H02M 1/0058; H02M 1/08; H02M 3/33569
See application file for complete search history.

(56) References Cited

U.S. PATENT DOCUMENTS 4,870,554 A * 9/1989 Smith ..... H02M 3/33538 363/131
5,173,846 A * 12/1992 Smith ..... H02M 3/33576 363/20
5,430,633 A * 7/1995 Smith ..... H02M 3/33569 363/131

(Continued)

FOREIGN PATENT DOCUMENTS

CN 1316726 C * 5/2007 ..... H02M 3/33569
CN 101030732 A * 9/2007 ..... H02M 3/33569
GB 2318927 A * 5/1998 ..... H02M 3/33569

*Primary Examiner* — Ovidio Escalante
(74) *Attorney, Agent, or Firm* — Wolf, Greenfield & Sacks, P.C.

(57) ABSTRACT

A flyback power converter includes a hybrid clamp circuit and a corresponding power management unit that substantially optimizes the performance of the flyback power converter in its entire line and load ranges. The clamp circuit, which is connected in parallel to a primary winding of the flyback transformer, includes a parallel combination of a capacitor and resistor that is connected in series with a parallel combination of a switch and a diode. By sensing the operating conditions, the power management circuit configures the clamp circuit either as a passive clamp or as an active clamp. In the passive-clamp configuration, the switch is kept turned off. In the active-clamp configuration, the switch operates with pulse-width modulation (PWM) which enables ZVS turn-on of the main switch.

41 Claims, 9 Drawing Sheets

(56) References Cited

U.S. PATENT DOCUMENTS 5,570,278 A * 10/1996 Cross ..... H02M 3/33569 363/131
5,621,623 A * 4/1997 Kuriyama ..... H02M 3/33538 363/20
5,796,595 A * 8/1998 Cross ..... H02M 3/285 363/131
5,805,434 A * 9/1998 Vinciarelli ..... H02M 1/34 363/16
5,986,905 A * 11/1999 Cheng ..... H02M 3/33569 363/16
6,061,252 A * 5/2000 Hosotani ..... H02M 3/33569 363/134
6,088,247 A * 7/2000 Cheng ..... H02M 3/33592 363/16
6,144,564 A * 11/2000 Fraidlin ..... H02M 3/33569 363/16
6,687,141 B2 * 2/2004 Odell ..... H02M 1/34 363/56.11
6,697,272 B2 * 2/2004 Nanbu ..... H02J 7/025 363/97
7,864,549 B1 * 1/2011 Wittenbreder, Jr. ..... H02M 3/33576 363/21.06
7,869,235 B2 * 1/2011 Lin ..... H02M 1/34 363/21.18
8,488,343 B2 * 7/2013 Hong ..... H02M 3/33569 363/21.18
9,077,254 B2 * 7/2015 Orr ..... H02M 3/33538
9,379,620 B2 * 6/2016 Zhang ..... H02M 3/01
9,667,132 B2 * 5/2017 Ghosh ..... H02M 3/33507
9,774,270 B2 * 9/2017 Phadke ..... H02M 3/33523
10,141,853 B2 11/2018 Song et al.
2007/0263415 A1 * 11/2007 Jansen ..... H02M 3/33507 363/21.03
2009/0097281 A1 * 4/2009 Lin ..... H02M 3/33569 363/21.18
2014/0029312 A1 * 1/2014 Telefus ..... H02M 3/33523 363/21.02
2016/0233779 A1 * 8/2016 Cohen ..... H02M 3/33592
2016/0276923 A1 * 9/2016 Hayakawa ..... H02M 1/34
2017/0070152 A1 * 3/2017 Liu ..... H02M 3/01
2018/0226895 A1 8/2018 Song et al.

* cited by examiner

POWER CONVERTER AND METHOD OF CONTROL THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATIONS*

*This application is a reissue of U.S. Pat. No. 10,141,853, issued on Nov. 27, 2018, filed as U.S. patent application Ser. No. 15/428,885 on Feb. 9, 2017, and entitled "POWER CONVERTER AND METHOD OF CONTROL THEREOF," which is incorporated herein by reference in its entirety.*

BACKGROUND

1. Field of the Invention

The present invention relates to a power management and control method of optimizing performance of power converters, in particular, the flyback converter.

2. Description of the Related Art

The use of wide-band-gap semiconductor devices and the demand for size reduction in today's external power supplies (e.g., adapters or chargers for laptops, tablets, mobile devices, game consoles, and printers) continue to drive substantial development and research efforts in high-efficiency and high-power-density power conversion technology. Generally, the size of a switch-mode power supply can be reduced by increasing the switching frequency because the sizes of passive components (e.g., transformers, input and output filters) can be reduced at a higher switching frequency.

As silicon-based devices approach their theoretical performance limits, further performance improvements of power supplies have become more difficult. However, emerging wide-band-gap devices (e.g., GaN-based and SiC-based devices) are expected to bring about future incremental efficiency improvements since these devices have a considerably lower gate charge and output capacitance than their silicon counterparts. Since wide-band-gap devices can operate at higher switching frequencies without deterioration in efficiency, such devices will enable further reductions in power supply size.

In low-power applications, the flyback topology is widely used due to its simplicity and lower cost. To achieve high efficiency at higher switching frequencies, switching losses have to be reduced. Reduction of switching losses can be achieved using various soft-switching techniques that utilize a circuit's parasitic components (e.g., leakage inductance of transformers and capacitance of semiconductor devices) to turn on a switch at a reduced voltage, or to turn it off at a reduced current. Specifically, under the zero-voltage-switching (ZVS) technique, the turn-on switching loss is eliminated by turning on a device at zero voltage and, under the zero-current-switching (ZCS) technique, the turn-off switching loss is eliminated by turning the device off at zero current.

An integral part of a flyback converter is the clamp circuit that processes the energy stored in the leakage inductance of the flyback transformer after the main switch is turned off. Generally, the flyback topology can be implemented with several clamp structures. Two common clamp structures are the RCD clamp and the active clamp, shown in FIGS. 1(a) and 1(b), respectively. In the RCD clamp, the energy stored in the leakage inductance of the flyback transformer is dissipated in the clamp resistor. In the active clamp, the energy stored in the leakage inductance is recycled and used to achieve ZVS turn-on of the main switch. It should be noted that, in the RCD clamp structure, ZVS turn-on of the main switch can be achieved only at an input voltage ($V_{IN}$) that is lower than N times the output voltage ($V_O$), where N is the turns ratio of the transformer (i.e., the ratio of the number of primary-winding turns to the number of secondary-winding turns). Thus, because of ZVS and leakage energy recycling, the active clamp approach generally exhibits better performance under high-load and high-input-voltage conditions than the RCD clamp approach. In contrast, at light-load conditions (i.e., when the flyback converter operates in discontinuous-conduction mode (DCM) and the active-clamp switch is turned on when the resonance between the magnetizing inductance of the flyback transformer and the circuit parasitic capacitances is almost completely damped out), the turn-on loss of the switch in the active clamp at a low input voltage (i.e., $V_{IN}<NV_O$) is greater than the loss reduction obtained by ZVS turn-on of the main switch. Furthermore, because the energy stored in the leakage inductance of the flyback transformer at a very light load is practically negligible, the performance of the flyback converter with an RCD clamp is better than that with an active clamp at very light-load and low-input-voltage (i.e., $V_{IN}<NV_O$) conditions.

It is thus desired to optimize the performance of the flyback converter over the entire line and load ranges.

SUMMARY

The present invention provides a flyback power converter with a hybrid clamp circuit (i.e., a combined circuit having both passive RCD circuit and active clamp circuit properties), and a corresponding power management unit that substantially optimizes the performance of the flyback power converter in its entire line and load ranges. According to one embodiment of the present invention, the clamp circuit, which is connected in parallel to a primary winding of the flyback transformer, includes a parallel combination of a capacitor and resistor that is connected in series with a parallel combination of a switch and a diode. By sensing the operating conditions, the power management unit configures the clamp circuit either as a passive clamp or as an active clamp. In the passive-clamp configuration, the switch is turned off, whereas, in the active-clamp configuration, the switch operates under pulse-width modulation (PWM) control which enables ZVS turn-on of the main switch. In one embodiment, the power management unit comprises an input-voltage sensing circuit, an output-voltage sensing circuit, an output-current sensing circuit, and a circuit (or an algorithm) that provides an enable/disable signal to control a switch of the clamp circuit.

The present invention is better understood upon consideration of the detailed description below in conjunction with the accompanying drawings.

BRIEF DESCRIPTION OF THE DRAWINGS

In the detailed description below, like elements are assigned like reference numerals.

DETAILED DESCRIPTION OF THE PREFERRED EMBODIMENTS

Figure 1A:
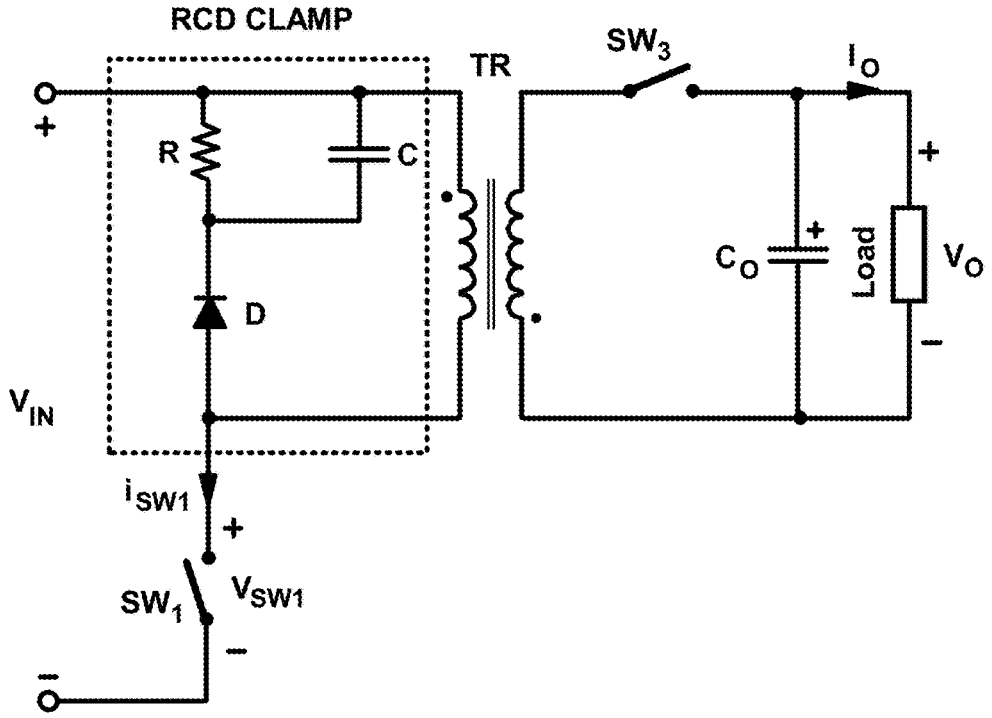
FIG. 1(a) (Prior Art)
FIG. 1(a) shows a prior art flyback converter with an RCD clamp.
Figure 1B:
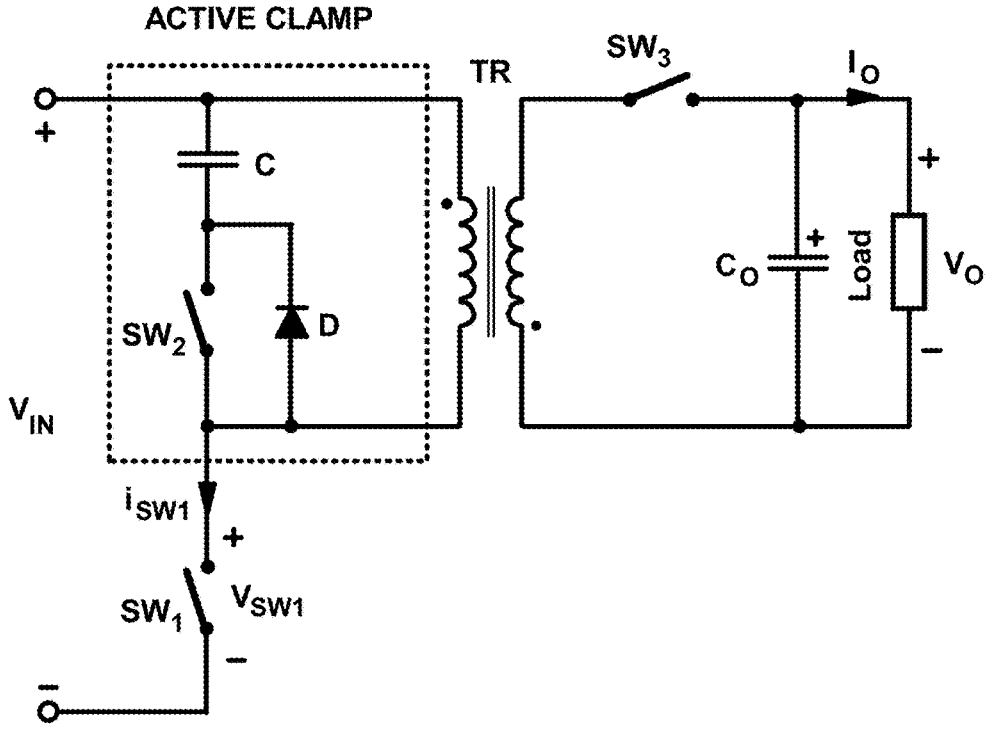
FIG. 1(b) (Prior Art)
FIG. 1(b) shows a prior art flyback converter with an active clamp.
Figure 2:
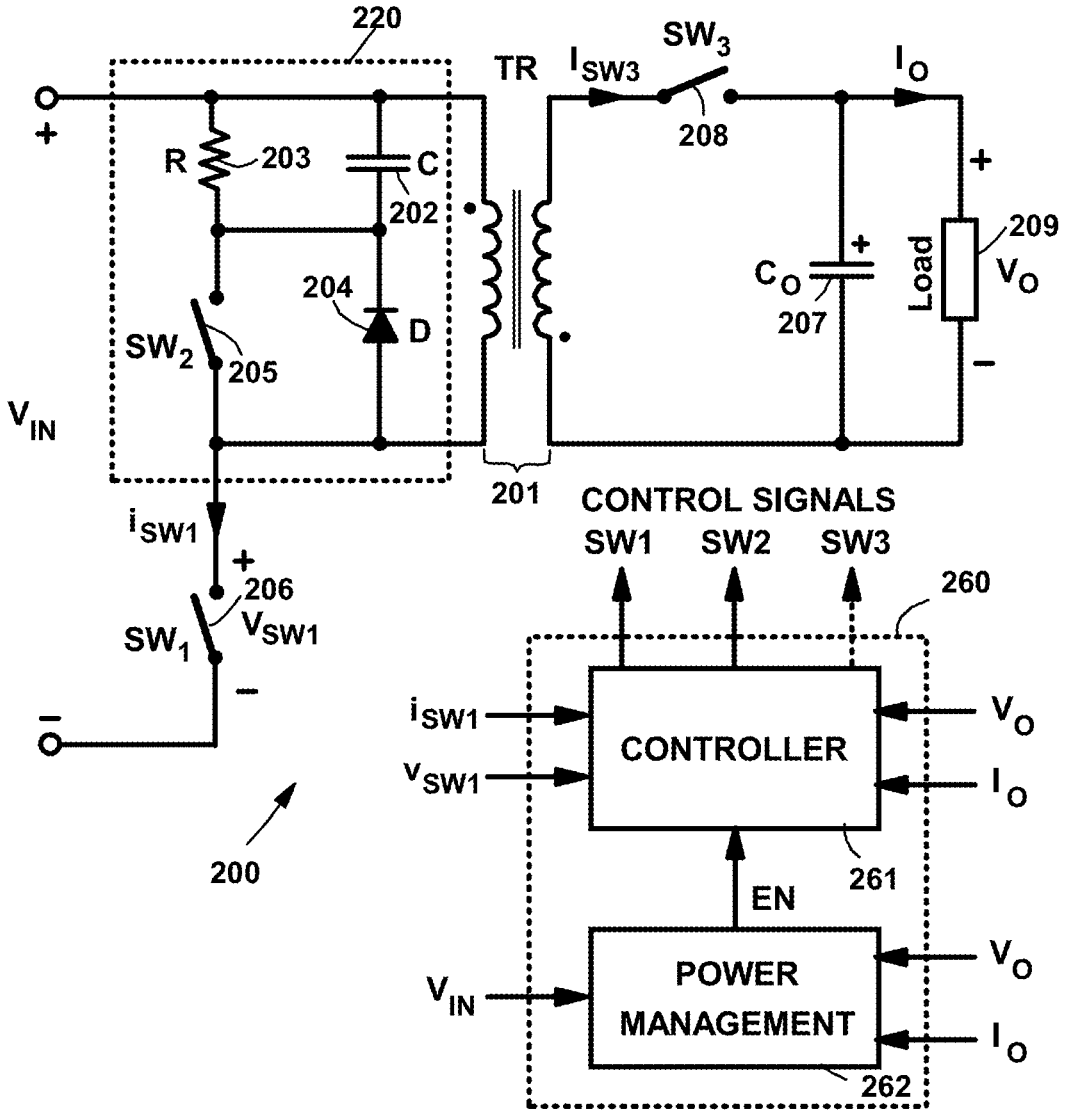
FIG. 2 is a circuit diagram of flyback converter 200 with hybrid clamp circuit 220, according to one embodiment of the present invention.

FIG. 2 is a circuit diagram of flyback converter 200 with hybrid clamp circuit 220, according to one embodiment of the present invention. As shown in FIG. 2, hybrid clamp circuit 220, which is connected in parallel with primary winding 201a of flyback transformer 201, includes a parallel combination of capacitor 202 and resistor 203 that is connected in series with a parallel combination of switch 205 and diode 204. FIG. 2 also shows control block 260, which includes controller 261 and power management unit 262. It should be noted that controller 261 and power management unit 262 can be implemented by hardware, software, or any combination of hardware and software. Generally, a hardware implementation includes analog and digital circuits, while a software implementation includes one or more microcontrollers, digital-signal processors, or both, that execute the algorithms that constitute controller 261 and power management unit 262.

Controller 261 provides control signals $SW_1$ (for main switch 206), $SW_2$ (for clamp switch 205), and $SW_3$ (for synchronous rectifier switch 208, if any) to regulate the output voltage, the output current, or both. In the exemplary embodiment of FIG. 2, the output control signals are generated in controller 261 based on sensed output voltage $V_O$ (across output capacitor 207) sensed output current $I_O$ drawn by load 209, sensed main-switch current $I_{SW1}$, sensed main-switch voltage $V_{SW1}$, and active-clamp enable signal EN from power management unit 262. However, controller 261 can also be implemented by sensing other converter's variables. In addition, if only one of the output variables (e.g., output voltage $V_O$ or output current $I_O$) is regulated, sensing the unregulated variable would not be necessary.

Power management unit 262 generates active-clamp enable signal EN, which enables active control of control signal $SW_2$ of clamp switch 205, based on flyback converter 200's operating conditions. In the embodiment in FIG. 2, flyback converter 200's operating conditions may be determined by sensing output voltage $V_O$, output current $I_O$ and input voltage $V_{IN}$. Where output voltage $V_O$ is constant, output current $I_O$ and input voltage $V_{IN}$ are sufficient to determine flyback converter 200's operating conditions. Other variables (e.g., primary switch current $I_{SW1}$, primary switch voltage $V_{SW1}$, secondary rectifier current $I_{SW3}$, and switching frequency) may also be used to determine flyback converter 200's operating conditions. In FIG. 2, when signal EN is LOW, hybrid clamp circuit 220 is configured to be a passive clamp by opening clamp switch 205 ("passive clamp operation"). Alternatively, when signal EN is HIGH, hybrid clamp circuit 220 is configured to be an active clamp ("active clamp operation"), with clamp switch 205 switching at the same frequency as main switch 206, to allow main switch 206 to turn on under ZVS condition. During active clamp operation, main switch 206 and clamp switch 205 do not both conduct at the same time, (i.e., clamp switch 206 is turned on after main switch 205 is turned off, and vice versa).

Figure 3:
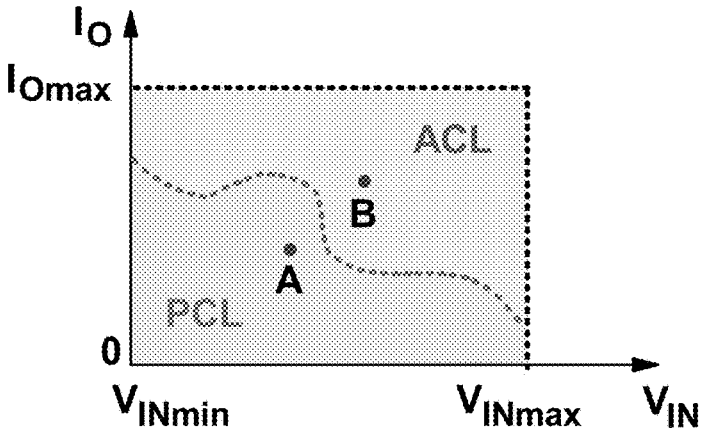
FIG. 3 shows desired regions of operation for passive clamp operation and active clamp operation with respect to output current Io and input voltage $V_{IN}$, in accordance with one embodiment of the present invention.
Figure 4:
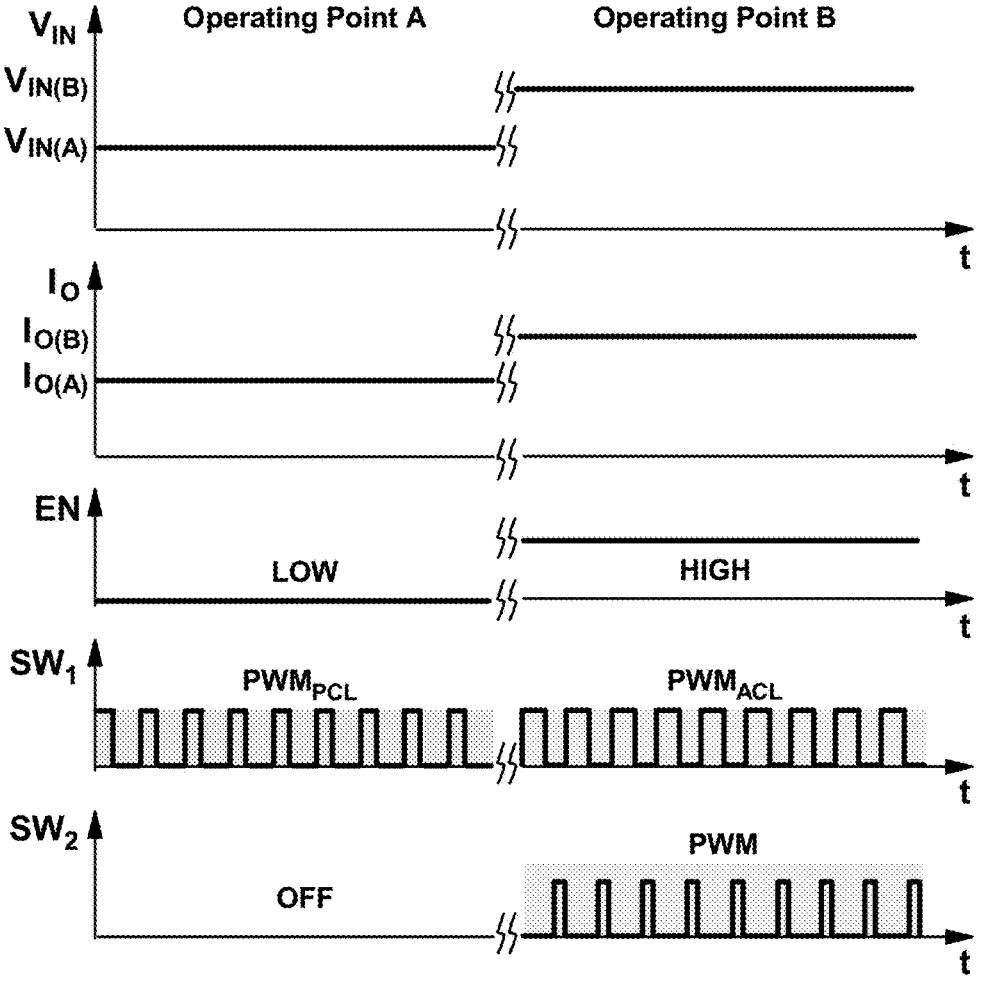
FIG. 4 shows signal transitions for input voltage $V_{IN}$, output current $I_o$, control signal EN, switch control signal $SW_1$ of main switch 206 and switch control signal $SW_2$ of clamp switch 205 at operation points A and B of FIG. 3, in accordance with one embodiment of the present invention.

FIGS. 3 and 4 illustrate the principles of operation of hybrid-clamp circuit 220. For example, FIG. 3 shows desired regions of operation PCL and ACL (for passive-clamp and active-clamp operations, respectively), with respect to output current $I_O$ and input voltage $V_{IN}$. In FIG. 3, the boundary between region PCL and ACL is indicated by dashed lines, as determined by a number of preferred optimization criteria (e.g., maximum efficiency). For example, when input voltage $V_{IN}$ and output current $I_O$ of flyback converter 200 have values represented by operating point "A" in FIG. 3, passive clamp operation is optimal, so that power management unit 262 sets signal EN to the logic LOW state. Thus, at operating point A, flyback converter 200 operates with hybrid clamp circuit 220 in the passive-clamp configuration (i.e., with only control signal $SW_1$ of main switch 206 modulated), as illustrated in FIG. 4. Alternatively, when input voltage $V_{IN}$ and output current $I_O$ of flyback converter 200 have values corresponding to operating point "B" in FIG. 3, active-clamp operation is optimal and power management unit 262 sets control signal EN to the logic HIGH state. Consequently, flyback converter 200 operates with hybrid clamp circuit 220 configured to be an active clamp. Under the active-clamp operation, switch control signals $S_{SW1}$ and $S_{SW2}$ of main switch 206 and clamp switch 205 are both modulated, as illustrated in FIG. 4.

Generally, the desired regions of operation for passive-clamp and active-clamp operations may be determined based on any arbitrary design optimization criteria. For example, besides efficiency, electromagnetic interference (EMI), component stress, and transformer performance are also optimization criteria. The desired regions of operation may be determined analytically or empirically (e.g., by calculations, simulations, or measurements on a prototype circuit). Whether analytically or empirically, the desired optimization criteria are evaluated for a number of operating points under passive-clamp and active-clamp operations. The evaluation determines whether active-clamp operation or passive-clamp operation provides better performance at each operating point. The boundary between the region favoring passive-clamp and the region favoring active-clamp operation can then be defined and used in the power-management algorithm implemented in power management unit 262. In a digital implementation, for example, boundary operating points may be stored in a look-up table to allow the power-management algorithm to dynamically test an actual operating point, so as to select the more preferable one between passive-clamp operation and active-clamp operation.

Figure 5:
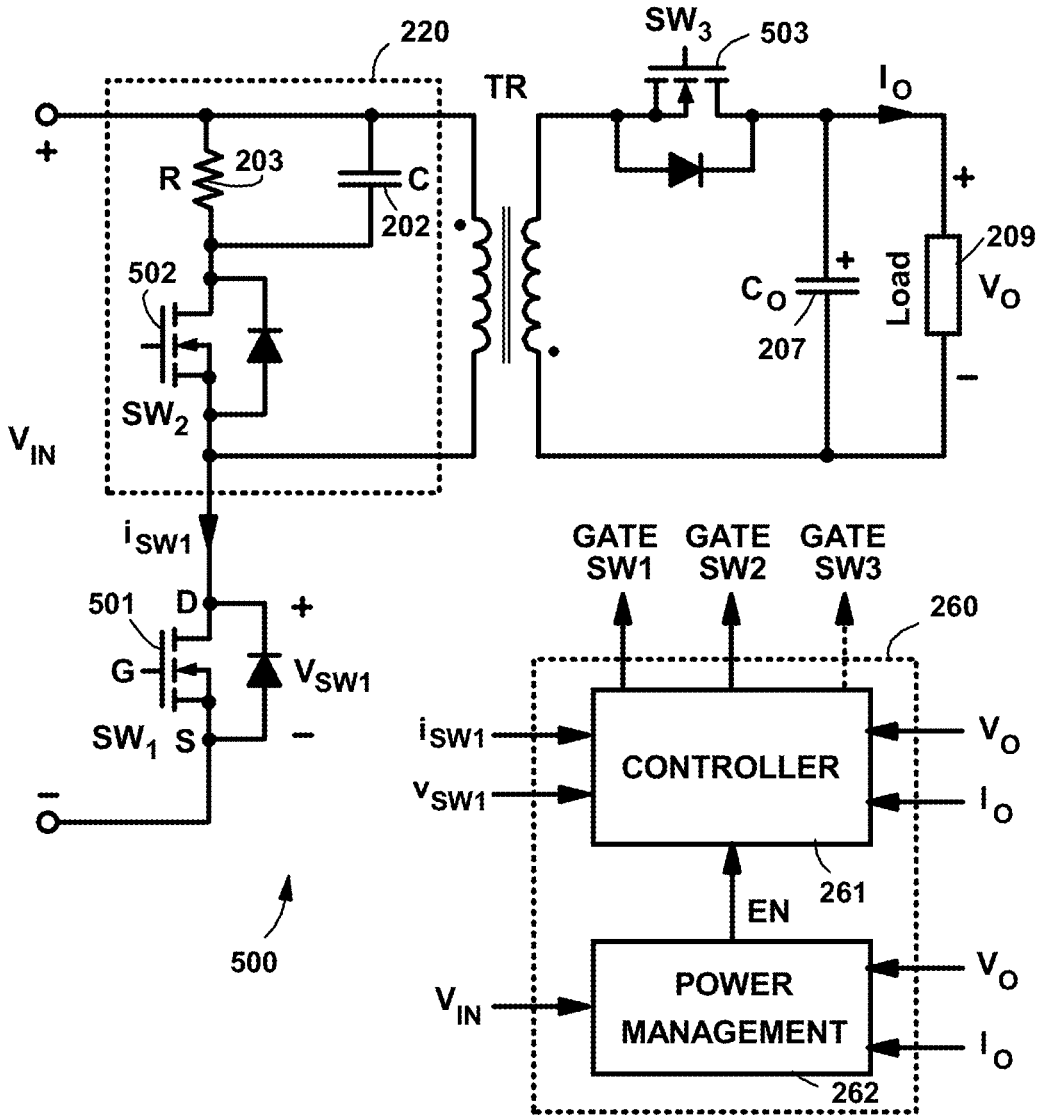
FIG. 5 shows implementation 500 of flyback converter 200 of FIG. 2, in which silicon MOSFET (Metal Oxide Semiconductor Field Effect Transistor) switches 501, 502 and 503 are used to implement main switch 206, clamp switch 205 and synchronous rectifier switch 208 of FIG. 2, respectively, in accordance with one embodiment of the present invention.
Figure 6:
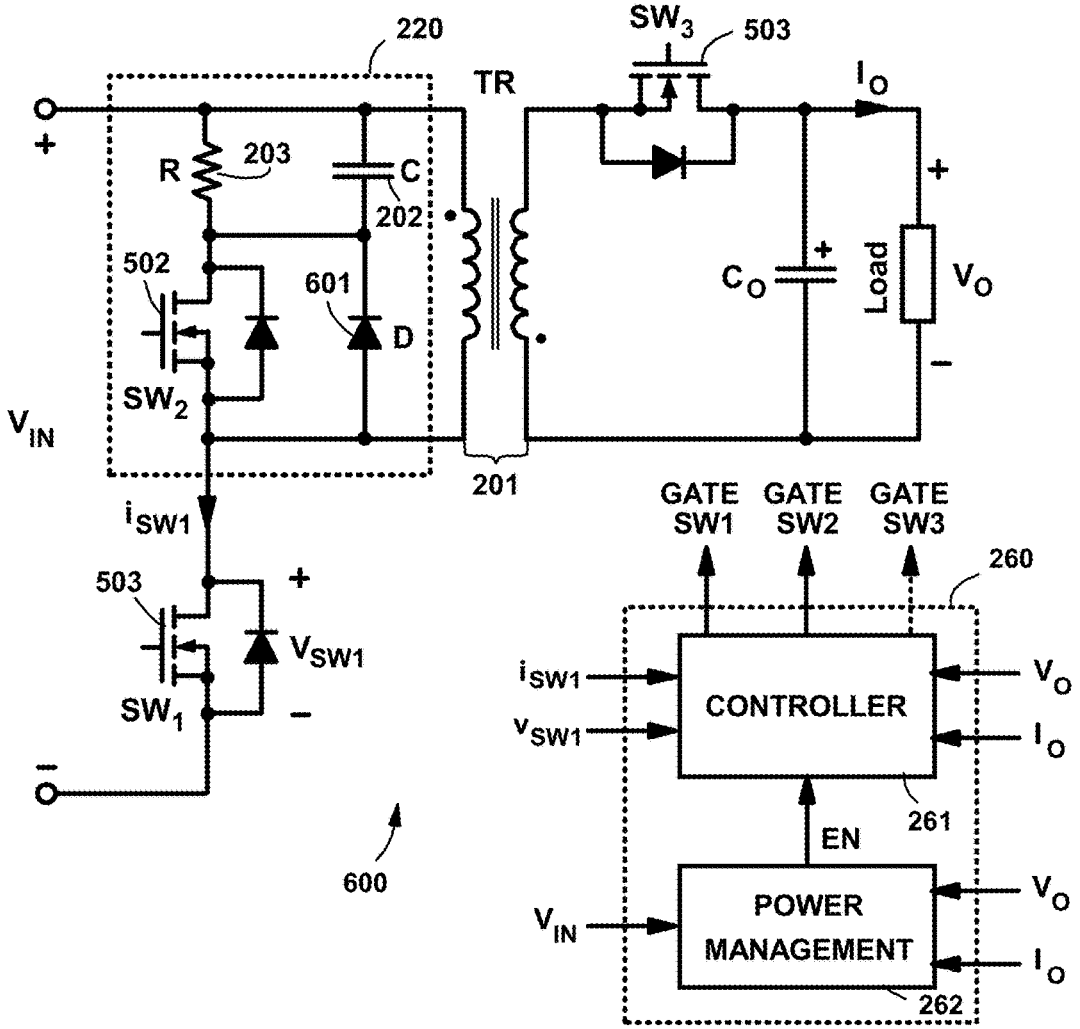
FIG. 6 shows implementation 600 of flyback converter of FIG. 2, which provides external diode 601 to implement the passive clamp structure, in accordance with one embodiment of the present invention.
Figure 7:
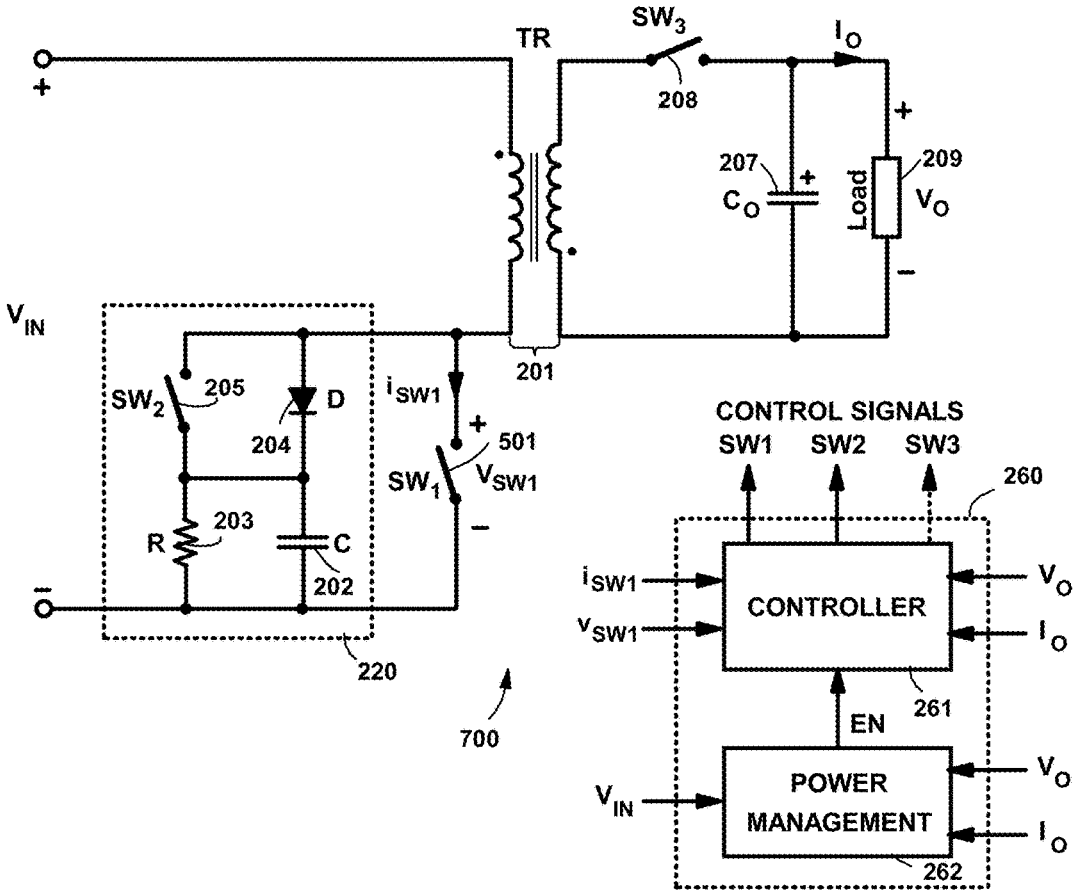
FIG. 7 is a circuit diagram of flyback converter 700 with hybrid clamp circuit 720, according to another embodiment of the present invention.

FIG. 5 shows implementation 500, in which silicon MOSFET (Metal Oxide Semiconductor Field Effect Transistor) switches 501, 502, and 503 are used to implement main switch 206, clamp switch 205, and synchronous rectifier switch 208 of FIG. 2, respectively, in accordance with one embodiment of the present invention. In FIG. 5, the body diode of MOSFET clamp switch 502 implements diode 204 in the passive-clamp structure. However, an external diode 601 can be connected to MOSFET clamp switch 502 to implement diode 204 of the passive clamp structure, as illustrated in implementation 600 of FIG. 6. The embodiments of the present invention shown in FIGS. 2, 5, and 6, can also be implemented by connecting hybrid-clamp circuit 220 in parallel with main switch 206 as illustrated in FIG. 7.

The embodiments of the present invention can also be implemented using GaN and SiC switches. Specifically, if beneficial, some or all of main switch 206, clamp switch 205, and synchronous rectifier switch 208 of FIG. 2 can be implemented with enhanced-mode or cascode GaN HEMT (High Electron Mobility Transistor), or SiC MOSFET. In an implementation where clamp switch 205 is implemented with an enhanced-mode GaN HEMT, which does not have a body diode, the reverse current trough the switch is carried by reverse conduction of the switch.

Figure 8A:
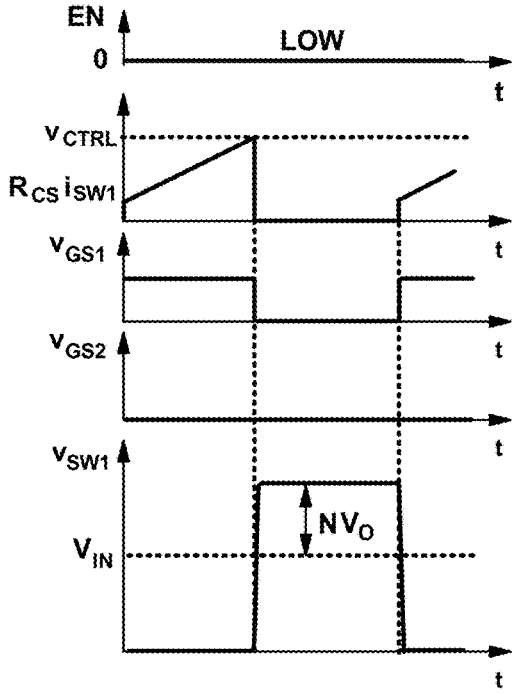
FIG. 8(a) shows key waveforms under passive clamp operation, when flyback converter 200 operates in CCM.
Figure 8B:
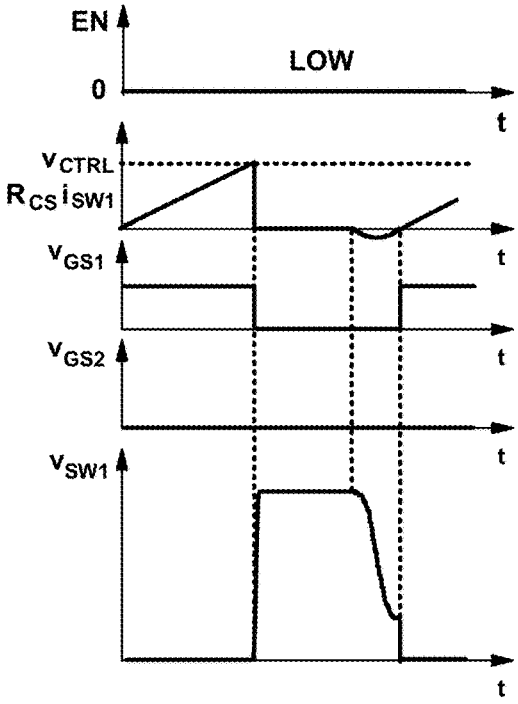
FIG. 8(b) shows key waveforms under passive clamp operation, when flyback converter 200 operates at CCM/DCM boundary.
Figure 8C:
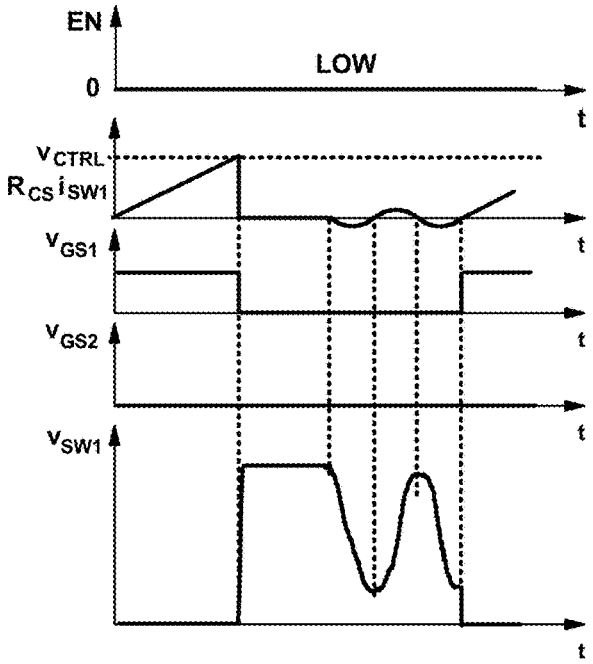
FIG. 8(c) shows key waveforms under passive clamp operation, when flyback converter 200 operates in DCM.

According to a control algorithm implemented in controller 261 of FIG. 2, flyback converter 200 with hybrid clamp circuit 220 can operate either in the continuous-conduction mode (CCM), at the boundary between CCM and DCM (CCM/DCM), or in DCM. When hybrid clamp circuit 220 is configured to be a passive clamp, main switch 206 operating under CCM turns on when voltage $V_{SW1}$ is equal to ($V_{IN}$+$NV_O$), as illustrated in FIG. 8(a), which also shows waveforms of key signals, including (i) the voltage drop across a current sensing resistor Rcs (not shown in FIG. 2) carrying current $I_{SW1}$ of main switch 206, which increases to control voltage $V_{CTRL}$ at an instant just before main switch 206 turns off, (ii) voltage $V_{GS1}$ which is the gate-to-source voltage of main switch 206, and (iii) voltage $V_{GS2}$ which is the gate-to-source voltage of clamp switch 205. Under DCM/CCM and DCM operations, main switch 206 turns-on with valley switching, as illustrated in FIGS. 8(b) and (c), respectively. Specifically, as shown in FIG. 8(b), under CCM/DCM, main switch 206 turns on at the first valley. In DCM, main switch 206 turns on at the second valley or at one of the subsequent valleys, as illustrated in FIG. 8(c). To achieve valley switching of main switch 206, controller 261 of FIG. 2 may include a valley detection circuit and a valley counter circuit.

Figure 9A:
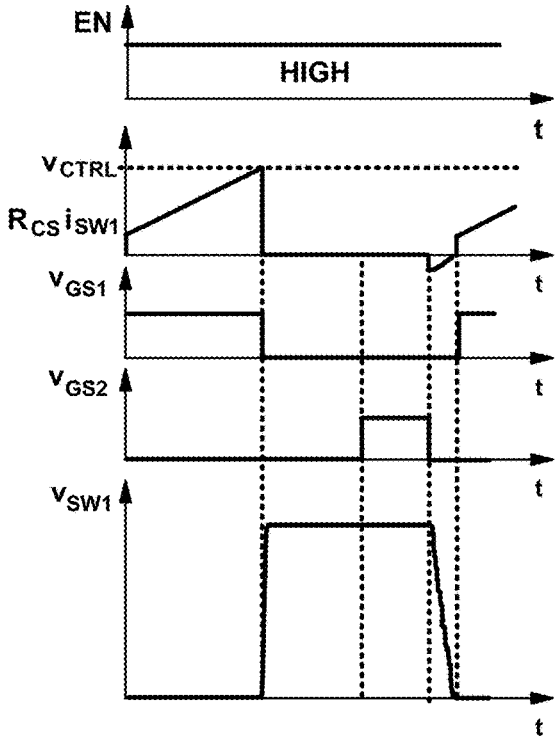
FIG. 9(a) shows key waveforms under active clamp operation, when flyback converter 200 operates in CCM.
Figure 9B:
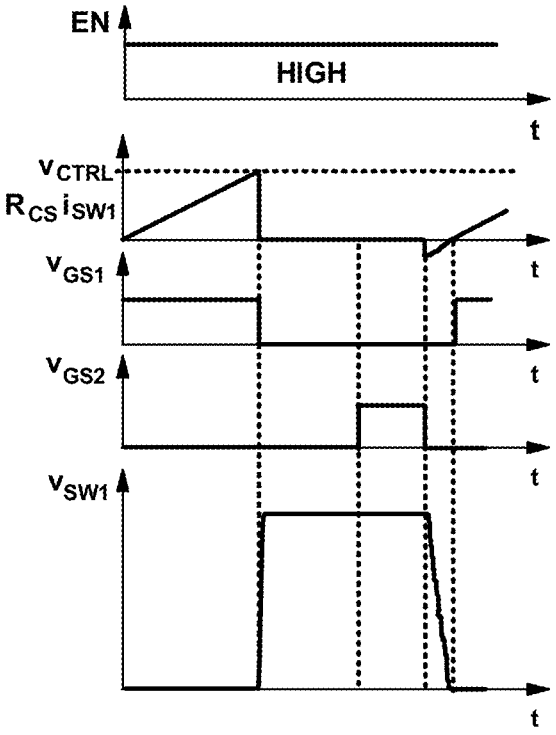
FIG. 9(b) shows key waveforms under active clamp operation, when flyback converter 200 operates at CCM/DCM boundary.
Figure 9C:
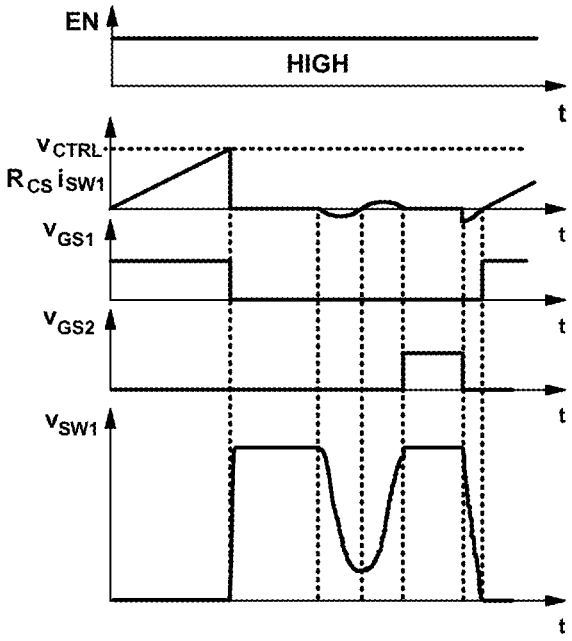
FIG. 9(c) shows key waveforms under active clamp operation, when flyback converter 200 operates in DCM.

When hybrid clamp circuit 220 is configured to be an active clamp, main switch 206 can be turned on with ZVS under all three modes of operation (i.e., CCM, CCM/DCM, and DCM) as illustrated in FIGS. 9(a)-(c). To achieve ZVS switching of main switch 206 in DCM, controller 261 in FIG. 2 includes a peak detection circuit and a peak counter circuit. As shown in FIG. 9(c), hybrid clamp switch 220 turns on after an appropriate peak detection of voltage $V_{SW1}$.

Under either passive-clamp operation or active-clamp operation, the mode of operation may be selected to achieve optimal performance for a given operating condition. For example, when flyback converter 200 is configured for passive-clamp operation at high frequencies, CCM/DCM is the optimal mode of operation at a moderate or full load, or low input voltage ($V_{IN}$) condition, as CCM/DCM offers ZVS or near ZVS of main switch 206 and ZCS of secondary-side rectifier diode or synchronous rectifier switch 208. Likewise, at light loads, DCM mode is typically preferred, as frequency foldback (i.e., decreasing switching frequency in response to a smaller load or a larger input voltage) is possible. Frequency foldback reduces switching losses and improves conversion efficiency.

When flyback converter 200 is configured for active-clamp operation, depending on the operating conditions, flyback converter 200 may operate in CCM, CCM/DCM, or DCM.

Generally, operation-mode optimization for either passive-clamp operation or active-clamp operation may be carried out in either power management unit 262, or controller 261, or in both. If implemented as a part of power management unit 262, power management unit 262 provides, in addition to control signal EN, additional information (not shown in the figures) to controller 261 to specify, for example, a mode of operation.

The detailed description above is provided to illustrate specific embodiments of the present invention and is not intended to be limiting. Numerous variations and modifications within the scope of the present invention are possible. The present invention is set forth in the following claims.

We claim:

1. A flyback power converter receiving an input voltage and providing an output voltage and an output current to a load, comprising:

a transformer having a primary winding and a secondary winding, the output voltage and the output current being provided to the load from the secondary winding;

a first switch coupled to the primary winding, the first switch coupling the input voltage across the primary winding when the first switch is turned on;

a clamp circuit comprising first and second parallel circuits coupled to each other in series, wherein the first parallel circuit comprises a second switch and a clamp diode, and wherein the second parallel circuit comprises a clamp capacitor and a clamp resistor[, such that the clamp circuit to provide an active clamp or a passive clamp, according to whether the second switch is closed or open];

a controller *configured to provide a first control signal* for regulating the output voltage or the output current by periodically turning on and off the first switch *and a second control signal for the second switch*; and a power management unit *configured to provide an enable/disable signal* for enabling or disabling switching of the second switch *by the second control signal* based on the flyback power converter's operating conditions,

*wherein the clamp circuit is configured to:*

*if the flyback power converter's operating conditions specify an active clamp, the second switch is enabled by the second control signal and both the first switch and the second switch are modulated by the first control signal and the second control signal, respectively, to*

*provide the active clamp, such that energy stored in a leakage inductance of the flyback power converter is at least partially recycled and used to achieve zero-voltage-switching (ZVS) for the first switch; and*

*if the flyback power converter's operating conditions specify a passive clamp, the second switch is disabled by the second control signal and the first switch is modulated by the first control signal, to provide the passive clamp, such that the energy stored in the leakage inductance of the flyback power converter is dissipated in the clamp resistor.*

[2. The flyback power converter of claim 1, wherein the power management unit keeps the second switch continuously off for a subset of the operating conditions.]

3. The flyback power converter of claim 1 wherein the operating conditions are determined based on at least one of the input voltage, a current through the first switch, the output voltage, the output current, and a switching frequency.

4. The flyback power converter of claim 3, further comprising a rectifier coupling the secondary winding to the load, wherein the operating conditions are further determined based on a current through the rectifier.

5. The flyback power converter of claim 1, wherein the flyback power converter operates in continuous-conduction mode, discontinuous-conduction mode, or at a boundary between the continuous-conduction mode and discontinuous-conduction mode.

6. The flyback power converter of claim 1, wherein the power management unit optimizes at least one of: converter efficiency, component stress, electro-magnetic-interference (EMI) performance, and transformer performance.

7. The flyback power converter of claim 1, wherein the power management unit selects the flyback power converter to operate in one of: a continuous-conduction mode, a discontinuous-conduction mode, or at a boundary between the continuous-conduction mode and discontinuous-conduction mode of operation based on the operating conditions.

8. The flyback power converter of claim 1, wherein the first switch and the second switch are not simultaneously turned on during operation.

9. The flyback power converter of claim 1, wherein the clamp circuit is coupled in parallel to the primary winding of the transformer.

10. The flyback power converter of claim 1, wherein the clamp circuit is coupled in parallel to the first switch.

11. The flyback power converter of claim 1, wherein the first switch is turned on at zero voltage or, when the input voltage is greater than N times the output voltage, at a voltage that substantially equals to a difference between the input voltage and N times the output voltage, N being the ratio of the number of primary-winding turns to the number of secondary-winding turns.

12. The flyback power converter of claim 1, wherein a body diode of the second switch serves as the clamp diode.

13. The flyback power converter of claim 1, further comprising a filter capacitor connected in parallel across the load, and wherein the filter capacitor and the load are coupled to the secondary winding of the transformer.

14. The flyback power converter of claim 13, wherein the filter capacitor and the load are coupled to the secondary winding of the transformer by a rectifier diode.

15. The flyback power converter of claim 13, wherein filter capacitor and the load are coupled to the secondary winding of the transformer by a third switch.

16. The flyback power converter of claim 15, wherein the third switch provides rectification.

17. The flyback power converter of claim 1, wherein the first switch turns on at a valley of a voltage across the first switch at a time when the second switch is disabled.

18. The flyback power converter of claim 1, wherein the second switch turns on at a peak of the voltage across the first switch.

19. The flyback power converter of claim 1, wherein at least one of the first and second switch comprises a GaN switch or a SiC switch.

20. The flyback power converter of claim 1, wherein the second switch comprises an enhancement mode GaN switch.

21. The flyback power converter of claim 20, wherein the GaN switch carries a reverse current by reverse conduction of the switch.

*22. A flyback power converter receiving an input voltage and providing an output voltage and an output current to a load, comprising:*

*a transformer having a primary winding and a secondary winding, the output voltage and the output current being provided to the load from the secondary winding;*

*a first switch coupled to the primary winding, the first switch coupling the input voltage across the primary winding when the first switch is turned on;*

*a clamp circuit comprising a second switch, a clamp capacitor, and a clamp resistor, the clamp resistor being connected with the clamp capacitor in parallel and being connected with the second switch in series; and*

*a control block comprising a controller and a power management unit and configured to provide a first control signal for regulating the output voltage or the output current by periodically turning on and off the first switch and a second control signal for the second switch for enabling or disabling switching of the second switch based on the flyback power converter's operating conditions,*

*wherein the clamp circuit is configured to:*

*if the flyback power converter's operating conditions specify an active clamp, the second switch is enabled by the second control signal and both the first switch and the second switch are modulated by the first control signal and the second control signal, respectively, to provide the active clamp, such that energy stored in a leakage inductance of the flyback power converter is at least partially recycled and used to achieve zero-voltage-switching (ZVS) for the first switch; and*

*if the flyback power converter's operating conditions specify a passive clamp, the second switch is disabled by the second control signal and the first switch is modulated by the first control signal, to provide the passive clamp, such that the energy stored in the leakage inductance of the flyback power converter is dissipated in the clamp resistor.*

*23. The flyback power converter of claim 22 wherein the operating conditions are determined based on at least one of the input voltage, a current through the first switch, the output voltage, the output current, and a switching frequency.*

*24. The flyback power converter of claim 23, further comprising a rectifier coupling the secondary winding to the load, wherein the operating conditions are further determined based on a current through the rectifier.*

*25. The flyback power converter of claim 22, wherein the control block optimizes at least one of: converter efficiency,*

*component stress, electro-magnetic-interference (EMI) performance, and transformer performance.*

*26. The flyback power converter of claim 22, wherein the first switch and the second switch are not simultaneously turned on during operation.*

*27. The flyback power converter of claim 22, wherein the first switch is turned on at zero voltage or, when the input voltage is greater than N times the output voltage, at a voltage that substantially equals to a difference between the input voltage and N times the output voltage, N being the ratio of the number of primary-winding turns to the number of secondary-winding turns.*

*28. The flyback power converter of claim 22, wherein the first switch turns on at a valley of a voltage across the first switch at a time when the second switch is disabled.*

*29. The flyback power converter of claim 22, wherein the second switch turns on at a peak of the voltage across the first switch.*

*30. The flyback power converter of claim 22, wherein the second switch is selected from at least one of a MOSFET switch, a GaN switch, and a SiC switch.*

*31. A flyback power converter receiving an input voltage and providing an output voltage and an output current to a load, comprising:*

*a transformer having a primary winding and a secondary winding, the output voltage and the output current being provided to the load from the secondary winding;*

*a first switch coupled to the primary winding, the first switch coupling the input voltage across the primary winding when the first switch is turned on;*

*a clamp circuit, coupled to the primary winding, comprising a second switch and a passive circuit with a resistor;*

*a controller configured to provide a first control signal for regulating the output voltage or the output current by periodically turning on and off the first switch and a second control signal for the second switch; and*

*a power management unit configured to provide an enable/disable signal for enabling or disabling switching of the second switch by the second control signal based on the flyback power converter's operating conditions, wherein the clamp circuit is configured to:*

*if the flyback power converter's operating conditions specify an active clamp, the second switch is enabled by the second control signal and both the first switch and the second switch are modulated by the first control signal and the second control signal, respectively, to provide the active clamp, such that energy stored in a leakage inductance of the flyback power converter is at least partially recycled and used to achieve zero-voltage-switching (ZVS) for the first switch; and*

*if the flyback power converter's operating conditions specify a passive clamp, the second switch is disabled by the second control signal and the first switch is modulated by the first control signal, to provide the passive clamp, such that the energy stored in the leakage inductance of the flyback power converter is dissipated in the clamp resistor.*

*32. The flyback power converter of claim 31 wherein the operating conditions are determined based on at least one of the input voltage, a current through the first switch, the output voltage, the output current, and a switching frequency.*

*33. The flyback power converter of claim 32, further comprising a rectifier coupling the secondary winding to the load, wherein the operating conditions are further determined based on a current through the rectifier.*

*34. The flyback power converter of claim 31, wherein the power management unit optimizes at least one of: converter efficiency, component stress, electro-magnetic-interference (EMI) performance, and transformer performance.*

*35. The flyback power converter of claim 31, wherein the first switch and the second switch are not simultaneously turned on during operation.*

*36. The flyback power converter of claim 31, wherein the first switch is turned on at zero voltage or, when the input voltage is greater than N times the output voltage, at a voltage that substantially equals to a difference between the input voltage and N times the output voltage, N being the ratio of the number of primary-winding turns to the number of secondary-winding turns.*

*37. The flyback power converter of claim 31, wherein the first switch turns on at a valley of a voltage across the first switch at a time when the second switch is disabled.*

*38. The flyback power converter of claim 31, wherein the second switch turns on at a peak of the voltage across the first switch.*

*39. The flyback power converter of claim 31, wherein the second switch is selected from at least one of a MOSFET switch, a GaN switch, and a SiC switch.*

*40. The flyback power converter of claim 1, wherein the power management unit provides information to the controller to specify a mode of operation.*

*41. The flyback power converter of claim 22, wherein the control block provides information to specify a mode of operation.*

*42. The flyback power converter of claim 31, wherein the power management unit provides information to the controller to specify a mode of operation.*

* * * * *